US005573827A

United States Patent [19]

Kubota et al.

[11] Patent Number: 5,573,827

[45] Date of Patent: Nov. 12, 1996

[54] FINE DOT-LIKE TONE DECORATIVE LAMINATES CONTAINING PIGMENTED FIBERS

[75] Inventors: Yoshikazu Kubota; Sunao Matsushima, both of Fujinomiya; Shigeo Takashima, Aichi-ken; Tsuneo Mitsuhasi, Aichi-ken; Takashi Kamiya, Aichi-ken, all of Japan

[73] Assignees: Kohjin Co., Ltd., Tokyo; Aica Kogyo Co., Ltd., Aichi-ken, both of Japan

[21] Appl. No.: 277,291

[22] Filed: Jul. 21, 1994

Related U.S. Application Data

[63] Continuation of Ser. No. 921,253, Jul. 29, 1992, abandoned.

[30] Foreign Application Priority Data

Jul. 31, 1991 [JP] Japan .................................. 3-214792

[51] Int. Cl.$^6$ .............................. B32B 5/16; D21F 11/00

[52] U.S. Cl. ......................... 428/143; 162/126; 162/130; 162/157.1; 162/157.7; 428/219; 428/297; 428/326; 428/327; 428/341; 428/342; 428/537.5

[58] Field of Search .................................. 428/113, 219, 428/297, 327, 303, 326, 328, 341, 342, 537.5, 143, 903; 156/62.2, 62.4, 272.2, 307.4; 162/126, 127, 128, 129, 130, 131, 157.1, 141, 149, 157.7, 162

[56] References Cited

U.S. PATENT DOCUMENTS

| | | | |
|---|---|---|---|
| 2,583,548 | 1/1952 | Craig | 162/181.2 |
| 3,378,433 | 5/1961 | Palazzolo et al. | 428/302 |
| 3,798,111 | 3/1974 | Lane et al. | 428/331 X |
| 4,044,185 | 8/1977 | McCaskey et al. | 428/153 |
| 4,060,450 | 11/1977 | Palazzolo et al. | 428/318 X |
| 4,308,542 | 12/1981 | Maekawa et al. | 428/211 X |
| 4,425,405 | 1/1984 | Murakami et al. | 428/342 |
| 4,505,974 | 3/1985 | Hosler | 428/329 |
| 4,895,759 | 1/1990 | Crawford | 428/331 |
| 4,952,278 | 8/1990 | Gregory et al. | 162/141 |

FOREIGN PATENT DOCUMENTS

| | | |
|---|---|---|
| 63-57232 | 3/1988 | Japan . |
| 63-84936 | 4/1988 | Japan . |
| 63-22980 | 5/1988 | Japan . |

*Primary Examiner*—Hoa T. Le
*Attorney, Agent, or Firm*—Oliff & Berridge

[57] ABSTRACT

Disclosed is a decorative laminates having a decorative paper and having a fine dot-like tone appearance. The decorative paper contains pigment(s) having a mean particle size of from 20 to 100 μm and/or powdery colored fibers having a mean fiber length of from 50 to 2000 μm as incorporated thereinto during papermaking. The fine dotlike tone appearance of the sheet is durable and is hardly worn away.

16 Claims, No Drawings

FINE DOT-LIKE TONE DECORATIVE LAMINATES CONTAINING PIGMENTED FIBERS

This is a Continuation of application Ser. No. 07/921,253 filed Jul. 29, 1992, now abandoned.

FIELD OF THE INVENTION

The present invention relates to a decorative laminates and, more precisely, to that having a fine dot-like tone appearance. The fine dot-like tone as referred to herein is one to yield an effect of visually admixing fine color dots as the outward appearance of a decorative laminates, and it indicates a delicate tone with different three-dimensional sense, softness and depth as varying in accordance with the direction to see the sheet.

BACKGROUND OF THE INVENTION

Various decorative laminates are known, which are made of various resins such as melamine resins, diallyl phthalate resins, acrylic resins or polyester resins, and they are widely used in various fields. Constitutions of them are described in detail, for example, in New Reader of Decorative Sheets (published by New Building Materials Research Institute on Nov. 20, 1968) and Handbook of Decorative Sheets (published by New Building Materials Rsearch Institute on Oct. 30, 1973).

For instance, a melamine decorative laminates is roughly grouped into two groups of a high-pressure melamine decorative laminates and a low-pressure (middle-pressure) melamine decorative laminates. As a general constitution, a high-pressure melamine decorative laminates is composed of a dipped over-laying layer of a resin-dipped over-laying paper, a decorative layer of a resin-dipped decorative paper as designed to be bluish, blackish, whitish or grayish in accordance with the use (this is often called a pattern paper or titanium paper), a core layer of a resin-dipped core paper, and a balance sheet layer, as laminated in this order from the outermost surface layer.

In the above-mentioned decorative laminates having a surface layer of a thermosetting resin such as melamine resins, diallyl phthalate resins, acrylic resins or polyester resins, various methods have heretofore been proposed for the purpose of designing the laminated sheet. For instance, a decorative laminates having a surface layer with metallic gloss is disclosed in JP-B 63-22980 and JP-A 63-57232 and 63-84936. (The terms "JP-B" and "JP-A" as used herein mean an "examined Japanese patent publication" and an "unexamined Japanese patent application", respectively.) The contents of these published or laid-open specifications are roughly as follows:

(1) JP-B 63-22980

A thermosetting resin decorative laminates with metallic gloss is prepared by using a thick paper (cardboard) containing mica having a particle size of from 10 to 50 μm and plural pigments, as the surface decorative paper.

(2) JP-A 63-57232

A high-quality decorative laminates having excellent durability and outward appearance is obtained by coating or impregnating a thermosetting resin containing a metallic gloss-imparting substance on or into the surface of either or both of an over-laying paper to be a surface-protecting layer or a decorative paper prior to integrating lamination of them with a substrate.

(3) JP-A 63-84936

A decorative laminates with a metallic glossy surface is obtained by printing an over-laying paper or a decorative paper with an ink containing a metallic gloss-imparting substance to be prepared by coating titanium oxide over the surfaces of pearlessence pigments or mica flakes.

However, the decorative laminates which have heretofore been proposed have no design art with a so-called fine dotlike tone.

(1) The decorative laminates as disclosed in JP-B 63-22980 is a so-called non-over-laying type decorative laminates not having an over-laying paper, but a design art with a fine dot-like tone is not applied thereto.

(2) The decorative laminates as disclosed in JP-A 63-57232 is one in which a thermosetting resin containing a gloss-imparting substance has been coated on or impregnated into an over-laying paper or a decorative paper. In the sheet, however, the gloss-imparting substance is not uniformly impregnated into the over-laying layer or decorative layer but is distributed essentially in the surface layer. Therefore, the sheet has a problem that the design thereof is lost due to abrasion.

(3) The decorative laminates as disclosed in JP-A 63-84936 is one in which an ink containing a gloss-imparting substance is coated over an over-laying paper or decorative paper. In the sheet, however, since the gloss-imparting substance is in the surface layer thereof, the sheet also has a problem that the design thereof is lost due to abrasion.

Where only an over-laying paper containing therein a substance capable of yielding a fine dot-like tone is used in preparing a decorative laminates, or where only an ink containing a fine dot-like tone-having substance is coated over an over-laying paper or decorative paper in preparing the same, the design of the sheet would often be lost due to abrasion. Therefore, especially when such a decorative laminates is used on a horizontal plane, the sheet hardly keep the design thereof continuously for a long period of time.

SUMMARY OF THE INVENTION

Under the situation, the object of the present invention is to provide a decorative laminates having a fine dot-like tone design which is hardly lost even by abrasion.

Specifically, the present invention provides a decorative laminates having a decorative paper, in which substance capable of yielding a fine dot-like tone has been incorporated into the decorative paper during papermaking thereof.

DETAILED EXPLANATION OF THE INVENTION

The present invention will be explained in detail hereunder.

Substances of yielding a fine dot-like tone to be used in the present invention are those which may express a fine dot-like tone design in a decorative paper when incorporated thereinto during papermaking of the paper. Where the paper is formed into a decorative laminates, the fine dot-like tone is further augmented on the sheet.

As such substances of yielding a fine dot-like tone, there are mentioned pigments having a mean particle size of from 20 to 100 μm and powdery colored fibers as processed to have a mean fiber length of from 50 to 2000 μm (preferably 100 to 500 μm). In accordance with the use and the intended design art, one or more of them are suitably selected for use in the present invention. Regarding the color of the substances of yielding a fine dot-like tone, one or more different color substances are suitably selected in accordance with the use and the intended design art.

Pigments of yielding a fine dot-like tone for use in the present invention have a larger particle size than ordinary pigments to be used for general coating, and they have a mean particle size of about 20 μm or more. If, however, the particle size is too large, the pigments would often drop to be lost in papermaking. In view of the point, pigments having a mean particle size of up to 100 μm or less are suitable. If, on the contrary, pigments having a mean particle size of less than 20 μm are used, the dots for the intended fine dot-like tone would be too small so that they could not yield a design of a fine dot-like tone. More specifically, as pigments of yielding a fine dot-like tone, there are mentioned, for example, so-called spherical pigments such as Rubcouleur acrylic resin colored beads (trade name by Dainichi Seika Kogyo K.K.), spherical titanium (produced by Tioxide Japan K.K.), silica-capsule macro particle pigment (produced by Sakai Chemical Co.) and spherical polyester (produced by Kyoei Calcium Co.).

Powdery colored fibers of yielding a fine dot-like tone for use in the present invention are ones to be obtained by powdering colored fibers by cutting, grinding or dry-powdering. Any of them having a mean fiber length of from 50 to 2000 μm can be used in the present invention. If, however, the mean fiber length of them is more than 2000 μm or less than 50 μm, they could hardly yield a design of a fine dot-like tone. Colored fibers having a size (i.e. fineness) of from 3 to 30 denier, preferably from 10 to 20 denier are used.

Since powdery colored fibers as colored with dyes have poor weather resistance, those as spinning colored or dope-dyed with pigments are preferred. For instance, preferred are dope-pigmented powdery rayon fibers or powdery pulp fibers as colored with pigments followed by treatment with a melamine resin or the like to make them water-proof.

For making a decorative paper into which such substance of yielding a fine dot-like tone has been incorporated thereinto during papermaking, any known papermaking method may be employed. The amount of the fine dot-like tone-yielding substance to be added thereto may be approximately from 0.1 to 150% by weight to pulp, generally approximately from 80 to 100% by weight thereto, depending upon the intended design art. If several different colored fibers are mixed, the design art would be further enhanced. Titanium oxide may be added to the decorative paper so as to impart a light-shielding property thereto; and the amount of such titanium oxide to be added thereto may be approximately from 10 to 50% by weight to pulp, depending upon the amount of the fine dot-like tone-imparting substance to be added. The weight of the decorative paper may be generally from 50 to 150 g/m$^2$. Natural pulps such as wood pulp, Manila hemp pulp and others which contain a high rate of α-cellulose are used. As wood pulp, either tree pulp, a needle-leaf tree pulp or broadleaf tree pulp, can be used. The trees are pulped by a soda process, kraft process and SP (sulphate pulp) process. The thermosetting resin to be impregnated into the decorative paper is not also specifically defined. For instance, one or more to be selected from melamine resins, diallyl phthalate resins, acrylic resins and polyester resins may be used.

For forming the thermosetting resin decorative laminates of the present invention, any known materials may be used and may be formed into the sheet by any known hot-pressing method. That is, the decorative paper of the present invention can be applied to any and every decorative laminates having a decorative paper. In order to impart any auxiliary design art to the decorative laminates of the present invention, the decorative paper and/or the over-laying paper of constituting the sheet may be optionally printed; or an over-laying paper containing fine dot-like tone-imparting substance therein may be laminated over the decorative paper containing fine dot-like tone-imparting substance therein.

The following examples are intended to illustrate the present invention more concretely, which, however, are not intended to restrict the scope of the present invention.

EXAMPLE 1

80% by weight to pulp tree Bleached Kraft Pulp (NBKP)/ Latifoliate Tree Bleached Kraft Pulp (LBK)=40/60) of 0.2 mm-cut dope dyed rayon (Cellcolor trade name by Kohjin Co.; brownish color, 15 denier) and 30% by weight to pulp of titanium oxide, which is for light-shielding, were incorporated into paper stock and made into a decorative paper having a weight of 85 g/m$^2$and having a brownish fine dot-like tone by a known papermaking method. Fixation of the dope-dyed rayon during papermaking was good, and it was uniformly dispersed in the decorative paper formed.

Next, a melamine resin was impregnated into the decorative paper in an amount of 130% by weight to the paper to give a melamine resin-impregnated decorative paper.

75% by weight of a phenolic resin was impregnated into a non-bleached kraft paper (190 g/m$^2$) to prepare a phenolic resin-impregnated core paper. Five sheets of the core paper were laminated to form a core layer. By an ordinary melamine decorative laminates preparing method, the above-mentioned melamine resin-impregnated decorative paper, the above-mentioned phenolic resin-impregnated core layer (composed of five sheets of core paper) and a melamine resin-impregnated balance sheet, which is generally used for prevention of warping, were laminated in this order from the outermost surface of the laminate, and these were subjected to integrating hot-pressing with a hot presser by an ordinary method to form a melamine decorative laminates of the present invention. The melamine decorative laminates had a fine dot-like tone design. Since a substance of yielding a fine dot-like tone was incorporated into the decorative paper during papermaking, the decorative laminates kept the excellent fine dot-like tone design for a long period of time even after the surface of the sheet worn away.

EXAMPLE 2

60% by weight to pulp (NBKP/LBKP=40/60) of 0.2 mm-cut dope-dyed rayon (Cellcolor, trade name by Kohjin Co.; grayish color, 15 denier) was incorporated into paper stock and formed into an over-laying paper having a weight of 60 g/ m$^2$ by an ordinary papermaking method. 150% by weight of a melamine resin was impregnated into the over-laying paper to give a resin-impregnated over-laying paper.

On the other hand, 80% by weight to pulp of 0.2 mm-cut dope-dyed rayon (Cellcolor, trade name by Kohjin Co.; grayish color, 15 denier) and 30% by weight to pulp of titanium oxide, which is for light-shielding, were incorporated into paper stock and made into a decorative paper having a weight of 85 g/m$^2$ and having a grayish fine dot-like tone by a known papermaking method. Fixation of the dope-dyed rayon during papermaking was good, and it was uniformly dispersed in the decorative paper formed.

Next, a melamine resin was impregnated into the decorative paper in an amount of 140% by weight to the paper to give a resin-impregnated decorative paper.

75% by weight of a phenolic resin was impregnated into a non-bleached kraft paper (190 g/m$^2$) to prepare a phenolic resin-impregnated core paper. Five sheets of the paper were laminated to form a core layer. By an ordinary melamine decorative laminates preparing method, the above-mentioned melamine resin-impregnated over-laying paper, the above-mentioned melamine resin-impregnated decorative paper, the above-mentioned phenolic resin-impregnated core layer (composed of five sheets of core paper) and a melamine resin-impregnated balance sheet, which is generally used for prevention of warping, were laminated in this order from the outermost surface of the laminate, and these were subjected to integrating hot-pressing with a hot presser by an ordinary method to form a melamine decorative laminates of the present invention.

The melamine decorative laminates had an excellent fine dot-like tone design. Since a substance of yielding a fine dot-like tone was incorporated into both the over-laying paper and the decorative paper during papermaking and of constituting the decorative laminates and the sheet had the over-laying layer, the sheet had excellent abrasion resistance. Even after the over-laying layer of the sheet had worn away, the sheet still kept the excellent fine dotlike tone design for a long period of time as the decorative paper layer of the sheet had the fine dot-like tone design.

EXAMPLE 3

40% by weight to pulp (NBKP/LBKP=40/60) of 0.1 mm-cut dope-dyed rayon (Cellcolor, trade name by Kohjin Co.; brownish color, 15 denier) and 40% by weight to pulp of 0.5 mm-cut dope-dyed rayon (Cellcolor, trade name by Kohjin Co.; grayish color, 15 denier) and 30% by weight to pulp of titanium oxide, which is for light-shielding, were incorporated into paper stock and made into a decorative paper having a weight of 85 g/m$^2$ and having brownish and grayish mixed fine dot-like tone by a known papermaking method. Fixation of the dope-dyed rayon during papermaking was good, and it was uniformly dispersed in the decorative paper formed.

Next, a melamine resin was impregnated into the decorative paper in an amount of 130% by weight to the paper to give a melamine resin-impregnated decorative paper.

75% by weight of a phenolic resin was impregnated into a non-bleached kraft paper (190 g/m$^2$) to prepare a phenolic resin-impregnated core paper. Five sheets of the core paper were laminated to form a core layer. By an ordinary melamine decorative laminates preparing method, the above-mentioned melamine resin-impregnated decorative paper, the above-mentioned phenolic resin-impregnated core layer (composed of five sheets of core paper) and a melamine resin-impregnated balance sheet, which is generally used for prevention of warping, were laminated in this order from the outermost surface of the laminate, and these were subjected to integrating hot-pressing with a hot presser by an ordinary method to form a melamine decorative laminates of the present invention. The melamine decorative laminates had a fine mixed dot-like tone design.

Since a substance of yielding a fine mixed dot-like tone was incorporated into the decorative paper during papermaking, the decorative laminates kept the excellent fine dot-like tone design for a long period of time even after the surface of the laminates worn away.

As explained in detail in the above, since the decorative laminates of the present invention contains a particular substance which yields a fine dot-like tone when incorporated into the constitutive decorative paper during papermaking and which yields a further excellent fine dotlike tone when the paper is formed into a decorative laminates, it has an excellent fine dot-like tone design.

In addition, since the substance of yielding a fine dot-like tone is incorporated into the decorative paper of constituting the decorative laminates of the present invention during papermaking of the paper, the fine dotlike tone is hardly lost even after the surface of the decorative laminates has worn away so that the sheet may keep the excellent design for a long period of time.

While the invention has been described in detail and with reference to specific embodiments thereof, it will be apparent to one skilled in the art that various changes and modifications can be made therein without departing from the spirit and scope thereof.

What is claimed is:

1. Decorative laminate comprising decorative paper having a fine dot appearance, in which the decorative paper contains natural pulp and powdery pigmented fibers having a mean fiber length of from 50 to 2000 μm.

2. The decorative laminate as claimed in claim 1, in which the pigmented fibers are pigmented rayons wherein viscose material of said rayons has been pigmented and spun-out.

3. The decorative laminate as claimed in claim 1, in which the pigmented fibers are synthetic fibers pigmented with color pigment(s).

4. The decorative laminate as claimed in claim 1, in which the pigmented fibers are those having a fineness of from 3 to 30 denier.

5. The decorative laminate as claimed in claim 1, in which the content of the pigmented fibers in the decorative paper is from 0.1 to 150% by weight to the natural pulp which constitutes the decorative paper.

6. The decorative laminate as claimed in claim 1, in which the decorative paper is one having a weight of from 50 to 150 g/m$^2$.

7. The decorative laminate as claimed in claim 1, wherein the pigmented fibers have a fineness of from 10 to 20 denier.

8. The decorative laminate as claimed in claim 1, wherein the content of the pigmented fibers in the decorative paper is from 80 to 100% by weight relative to the natural pulp.

9. The decorative laminate as claimed in claim 1, wherein the decorative paper is contained in a surface layer of the decorative laminates.

10. The decorative laminate as claimed in claim 1, wherein an overlay paper is provided on a surface of the decorative paper.

11. A decorative paper for a decorative laminate, in which the decorative paper has a fine dot appearance and contains natural pulp an powdery pigmented fibers having a mean fiber length of from 50 to 2000 μm.

12. The decorative paper as claimed in claim 11, in which the pigmented fibers are pigmented rayons wherein viscose material of said rayons has been pigmented and spun-out.

13. The decorative paper as claimed in claim 11, in which the pigmented fibers are synthetic fibers pigmented with color pigment(s).

14. The decorative paper as claimed in claim 11, in which the pigmented fibers are those having a fineness of from 3 to 30 denier.

15. The decorative paper as claimed in claim 11, in which the content of the pigmented fibers is from 0.1 to 150% by weight relative to the natural pulp.

16. The decorative paper as claimed in claim 11, which has a weight of from 50 to 150 g/m$^2$.

* * * * *